United States Patent [19]

Nakaya et al.

[11] Patent Number: 4,799,170
[45] Date of Patent: Jan. 17, 1989

[54] METHOD OF MEASURING BY COORDINATE MEASURING INSTRUMENT

[75] Inventors: Tadao Nakaya, Utsunomiya; Shinji Ide, Shimizu, both of Japan

[73] Assignees: Mitutoyo Mfg. Co. Ltd., Tokyo; Shimizu Kiden Co., Ltd., Shizuoka, both of Japan

[21] Appl. No.: 841,104

[22] Filed: Mar. 18, 1986

[30] Foreign Application Priority Data

Mar. 19, 1985 [JP] Japan ................................. 60-55092
Mar. 19, 1985 [JP] Japan ................................. 60-55093

[51] Int. Cl.⁴ .......................... G06F 15/46; G01B 5/20
[52] U.S. Cl. .................................... 364/513; 364/560; 901/4; 33/504
[58] Field of Search ................ 364/560, 513, 474–475, 364/193; 901/44, 46, 4; 33/503, 504, 505; 414/730

[56] References Cited

U.S. PATENT DOCUMENTS

| | | | |
|---|---|---|---|
| 3,920,972 | 11/1975 | Corwin, Jr. et al. | 364/193 |
| 4,105,937 | 8/1978 | Tuda et al. | 364/193 |
| 4,224,501 | 9/1980 | Lindbom et al. | 901/4 |
| 4,239,431 | 12/1980 | Davini | 364/193 |
| 4,283,764 | 8/1981 | Crum et al. | 364/193 |
| 4,296,474 | 10/1981 | Hurt | 364/560 |
| 4,328,623 | 5/1982 | Juengel et al. | 33/505 |
| 4,333,238 | 6/1982 | McMurtry | 33/504 |
| 4,356,556 | 10/1982 | Sterki | 364/560 |
| 4,360,886 | 11/1982 | Kostas et al. | 364/551 |
| 4,364,178 | 12/1982 | Huet | 33/504 |
| 4,365,301 | 12/1982 | Arnold et al. | 364/475 |
| 4,402,053 | 8/1983 | Kelley et al. | 364/478 |
| 4,437,151 | 3/1984 | Hurt et al. | 364/560 |
| 4,484,293 | 11/1984 | Minucciani et al. | 364/513 |
| 4,484,294 | 11/1984 | Noss | 364/513 |
| 4,485,453 | 11/1984 | Taylor | 364/560 |
| 4,534,006 | 8/1985 | Minucciani et al. | 364/513 |
| 4,595,989 | 6/1986 | Yasukawa et al. | 364/513 |
| 4,611,156 | 9/1986 | Feichtinger | 364/474 |
| 4,620,831 | 11/1986 | Poncet et al. | 364/513 |
| 4,653,011 | 3/1987 | Iwano | 364/560 |
| 4,677,755 | 7/1987 | Iwano et al. | 33/504 |

OTHER PUBLICATIONS

Merritt, Rich; "Industrial Robots: Getting Smarter All the Time", Jul. 1982; pp. 32–38, Instruments & Control Systems.

Primary Examiner—Parshotam S. Lall
Assistant Examiner—S. A. Melnick
Attorney, Agent, or Firm—Flynn, Thiel, Boutell & Tanis

[57] ABSTRACT

The present invention relates to a method of measuring by a coordinate measuring instrument. A detecting element is manually moved along a sample of work to be measured in accordance with a predetermined sequence of measuring steps. A moving path of the detecting element is detected by displacement detectors which produce output signals which are inputted to a command unit incorporated in a robot mechanism for storage. Subsequently, a data processing unit gives a command to carry out an automatic measuring sequence, and the robot mechanism is moved along the stored moving path by its drive system, whereby measurement results for dimensions are calculated on the basis of data acquired during the automatic measuring due to the contact between the detecting element and the work and data stored during the manual set-up phase. The detecting element is uncoupled from the drive system of the robot mechanism during the manual set-up phase.

4 Claims, 5 Drawing Sheets

METHOD OF MEASURING BY COORDINATE MEASURING INSTRUMENT

BACKGROUND OF THE INVENTION

1. Field of the Invention

This invention relates to a method of measuring by a coordinate measuring instrument, and is used for measurement automated by a robot of manually operated type coordinate measuring instrument, in particular.

2. Description of the Prior Art

To measure dimensions, contour and the like of a work to be measured, which has a complicated contour, in general, coordinate measuring instruments have been widely used.

The following two types of coordinate measuring instruments are known. Namely, one of those is a manual type, wherein an operator grasps a probe or a portion close to the probe, successively brings the probe into abutting contact with a measuring surface of the work in accordance with predetermined measuring steps, and the dimensions, contour and the like of the work are sought from a displacement value of the probe at the time of contact. The other is an automatic type, for example, a CNC (Computer Numerical Control) tri-dimensional measuring instrument, wherein a main body of measuring instrument is provided thereon with driving means such as a screw and motor for moving the probe in respective directions, of X-, Y- and Z-axes, and the probe is successively brought into abutting contact with the measuring surface of the work while these driving means are automatically controlled in accordance with previously programmed steps.

The former type is simplified in construction, whereby there are few factors affecting the measuring accuracy due to the construction, so that a measured value with high accuracy can be advantageously obtained. On the contrary, the following disadvantages are presented. Namely, (1) Since the operator must remember all of the portions to be measured and all of the steps with every work, a mistaken operation tends to occur. Moreover, this situation changes with every work.

(2) Simultaneously with the above, operations associated with a data processing unit are needed, whereby specialized and technical knowledge is required from the operator. In consequence, it cannot be said everybody can perform the operations. As viewed from the mode of measuring, the specialist is occupied by the measuring instrument and cannot be utilized for any other operation. Furthermore, it is difficult to gather many such specialists.

(3) With a large-sized measuring instrument permitting a large measuring scope, when all of the measuring points of the work are measured, the measurer should move around the measuring instrument or operate the measuring instrument from a measuring stand, whereby the measuring efficiency is lowered and the safety lacks.

(4) When the operating time period is extended, the temperature of body is imparted from hand to the probe and the like, with the result that the measuring accuracy may be lowered due to the thermal expansion of the probe and the like.

In contrast thereto, the latter type has obviated the disadvantages in the former and is suitable for the repeated measurements of works, which are identical with one another. On the contrary, in order to automatically move the probe in the directions of X-, Y- and Z-axes, driving means such as a screw, motor and the like should be mounted to a main body of the measuring instrument, particularly to a slider supporting a probe shaft, and further, to a beam supporting the slider, whereby the construction for supporting the above-described members cannot but be large-sized. Then, distortions, and deflections are caused to the structure of the foundation with the increase in the weight of the above-described members, with the result that the measuring accuracy is disadvantageously lowered.

SUMMARY OF THE INVENTION

The present invention has been developed to obviate the above-described disadvantages of the prior art and has as its object the provision of a method of measuring by a coordinate measuring instrument wherein, the advantages in the manual and automatic type measuring instruments are maintained, while the disadvantages in both types are obviated, and a moving path for moving a detecting element in accordance with a measuring program for automatic operation is efficiently established.

To this end, the present invention contemplates that movement of a detecting element such as a touch signal probe movable in tri-dimensional direction through a moving mechanism is performed by a robot mechanism independent of a main body of the measuring instrument, i.e. driving means for automatization are independently provided, whereby the disadvantages of the manual and automatic type measuring instruments are obviated, the detecting element is manually moved in accordance with predetermined steps, output signals from detectors or displacement detectors are fetched to a robot operating command unit provided in the side of the robot mechanism, and, during the measuring task, the robot mechanism is operated while the moving path data thus stored is successively read in accordance with the measuring step program.

BRIEF DESCRIPTION OF THE DRAWINGS

FIGS. 1 to 5 show one embodiment of the present invention, in which:

FIG. 1 is the general perspective view;

FIG. 2 is a side view illustrating the essential portions of the robot mechanism;

FIG. 3 is a block diagram illustrating a circuit arrangment;

FIG. 4 is a flow chart illustrating the processing operations of the data processing unit and of the robot operating command unit; and FIG. 5 is a general perspective view showing another embodiment of the device to which the method of the present invention is applied.

DETAILED DESCRIPTION OF THE PREFERRED EMBODIMENT

Figure 1:
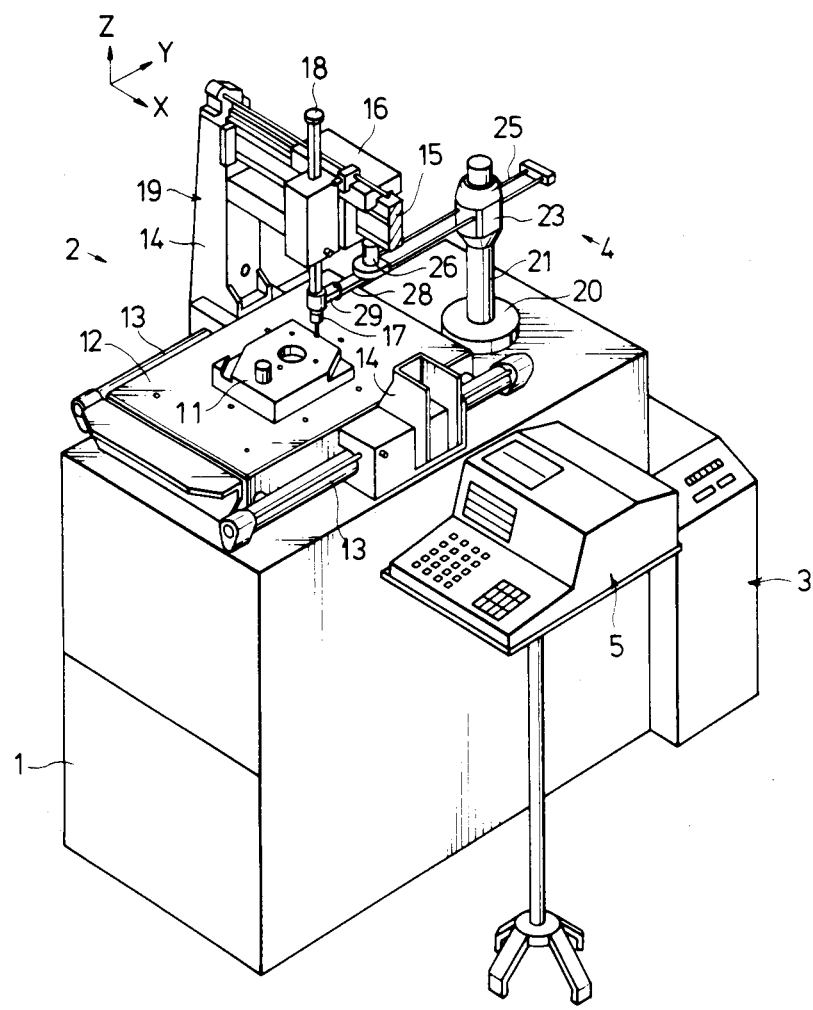

FIG. 1 shows the outer appearance of a measuring system to which the method of the present invention is applied. Referring to this drawing, provided on the top surface of an installation base 1 are a main body of tri-dimensional measuring instrument 2 and a robot mechanism 4 provided independently of the tri-dimensional measuring instrument 2, for being operated in response to an operating command from a robot operating command unit 3. Additionally, measured data measured by the main body of tri-dimensional measuring instrument 2 are delivered to a data processing unit 5, where the measured data are processed in a predetermined manner, and thereafter, outputted as a value indicating a dimension or a shape of a work to be measured.

The main body of tri-dimensional measuring instrument 2 is provided at opposite sides of a mount 12 having rested thereon the work 11 through guide rails 13, respectively, with supports 14 being movable in the longitudinal direction of the mount 12 (direction of Y-axis), along a horizontal beam 15 racked across the both supports 14 with a slider 16 being movable in the lateral direction of the mount 12 (direction of X-axis), and at the bottom end of this slider 16 with a probe shaft 18 having a touch signal probe 17 as being a detecting element which concerns to the work 11 on the mount 12, being movable in the vertical direction of the mount 12 (direction of Z-axis). Here, a moving mechanism 19 consisting of the supports 14, slider 16, probe shaft 18 and the like can move the touch signal probe 17 a tri-dimensional directions through a relatively light force by use of an air bearing or the like for example. With this arrangement, during movement of the touch signal probe 17, when the touch signal probe 17 comes into contact with the work 11, positions of the supports 14 in the direction of Y-axis, a position of the slider 16 in the direction of X-axis and a position of the probe shaft 18 in the direction of Z-axis are delivered to the data processing unit 5, where measured data are processed in a predetermined manner, and thereafter, digitally indicated as the measured value.

Figure 2:
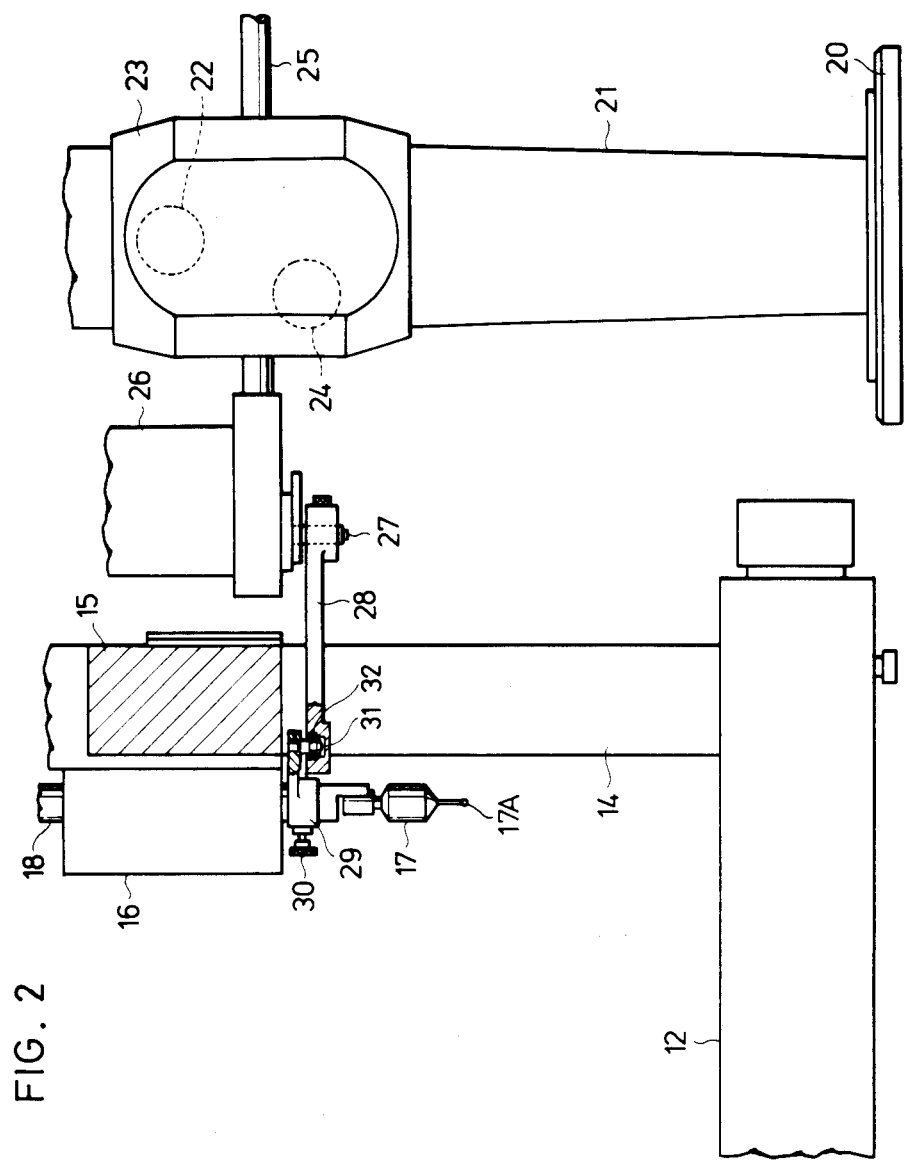

As shown in FIG. 2, the robot mechanism 4 includes: a Z shaft 21 vertically erected on a base 20 fixed onto the top surface of the mount 1; a vertically movable block 23 provided on this Z shaft in a manner to be vertically movable by the driving of a Z-axis driving motor 22 in the direction of Z-axis; two linearly movable rods 25 as being a linearly movable means provided on this vertically movable block 23, being parallel to each other and linearly movable by the driving of a Y-axis driving motor 24 in the direction of Y-axis; a rotary shaft 27 provided at ends of the two linearly movable rods 25 on one side, being in parallel to the Z-axis and rotatable by the driving of a swingably driving motor 26; a swingable arm 28 fixed at a proximal end thereof to the rotary shaft 27; and a connecting arm 29 for connecting the forward end of this swingable arm 28 and the probe shaft 18 disposed adjacent the touch signal probe 17 to each other. The connecting arm 29 is fixed at one end thereof on the side of the probe shaft 18 to the probe shaft 18 through a set-screw 30 and rotatably connected at the other end thereof on the side of the swingable arm 28 to the swingable arm 28 in a manner to be rotatable, through a connecting shaft 31 and a bearing 32 (Refer to FIG. 3). Furthermore, clutches, not shown, are inserted between the Z-axis driving motor 22 or the robot mechanism 4 and the vertically movable block 23, between the Y-axis driving motor 24 and the linearly movable rod 25 and between the swingably driving motor 26 and the rotary shaft 27, respectively. With this arrangement, when the respective motors 22, 24 and 26 of the robot mechanism 4 are driven with the respective clutches being engaged therewith, the touch signal probe 17 is adapted to be moved through the moving mechanism 19 in the tri-dimensional directions, and moreover, when the touch signal probe 17 being manually grasped is moved in the tri-dimensional directions with the respective clutches being disengaged, the robot mechanism 4 as well as the moving mechanism 19 make motions following thereto. In short, the robot mechanism 4 is constructed such as to be moved in the reversible manner.

Figure 3:
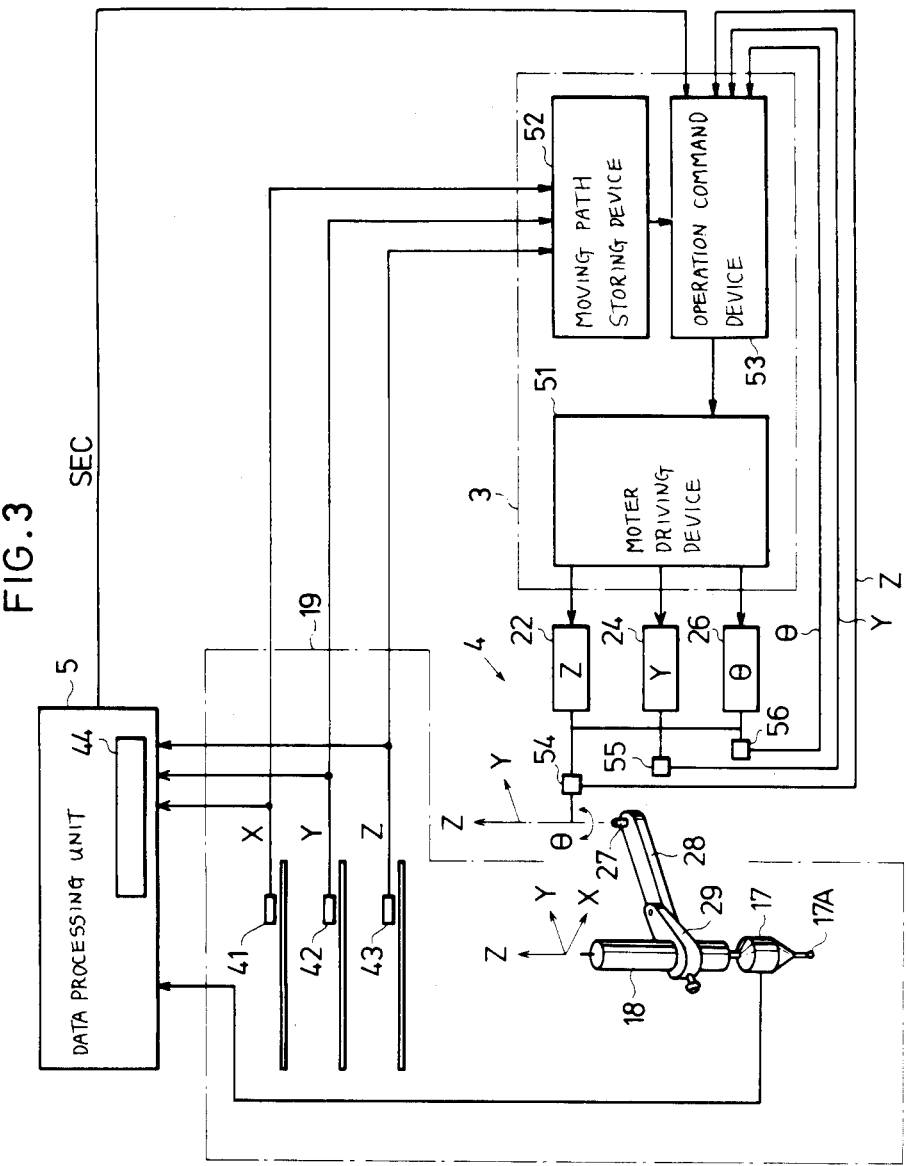

FIG. 3 shows the circuit arrangment of this measuring system. Referring to this drawing, numeral 41 references an X-axis displacement detector for detecting a displacement value of the slider 16 in the direction of X-axis, i.e. a displacement value of the touch signal probe 17 in the direction of X-axis, 42 a Y-axis displacement detector for detecting a displacement value of one of the supports 14 in the direction of Y-axis, i.e. a displacement value of the touch signal probe 17 in the direction of Y-axis, and 43 is a Z-axis displacement detector for detecting a displacement value of the probe shaft 18 in the direction of Z-axis, i.e. a displacement value of the touch signal probe 17 in the direction of Z-axis. Measured data of the touch signal probe 17 in the directions of X-, Y- and Z-axes as detected by these displacements detectors 41, 42 and 43 are obtained in such a manner that a measuring element 17A of the touch signal probe 17 comes into contact with the work 11, and, when a touch signal from the touch signal probe 17 is delivered to the data processing unit 5, the data is fetched into the data processing unit 5.

The data processing unit 5 operates such that measured data from the displacement detectors 41, 42 and 43 is processed to seek the dimensions or the like of the work 11. The data processing unit 5 has a measuring step program memory 44 for storing a measuring step program including a plurality of steps, in which the measuring steps are preset, in addition to memories for storing the measured data and a memory for storing a calculating process program to perform calculations in accordance with a measuring mode on the basis of the measured data stored in the above-described memories. The data processing unit 5 carries out the processing of a flow chart shown to the left from a chain line in FIG. 4 in accordance with the measuring step program stored in this measuring step program memory 44.

More specifically, the data processing unit 5 gives a step exciting command SEC to the robot operating command unit 3 in accordance with the measuring step program stored in the measuring step program memory 44, whereby the robot mechanism 4 performs a predetermined operation in response to the command from the robot operating command unit 3. During this operation, if a predetermined number of measured data from the displacement detectors 41, 42 and 43 are inputted, then the data processing unit 5 carries out calculations on the basis of these measured data, and thereafter, gives a succeeding step exciting command to the robot operating command unit 3. The processes are repeated over all the steps of the measuring step program stored in the measuring step program memory 44.

The robot operating command unit 3 includes: a motor driving device 51 for driving the Z-axis driving motor 22, Y-axis driving motor 24 and swingably driving motor 26; a moving path storing device 52 for storing a moving path of the touch signal probe 17 obtained in the detecting element moving step storing process; an operation command device 53 for driving the Z-axis driving motor 22, Y-axis driving motor 24 and swingably driving motor 26 on the basis of the command value, which is obtained by a conversion of the moving path data stored in the moving path storing device 52 into the driving value of respective motors 22, 24 and 26 when the step exciting command SEC is given from the data processing unit 5. Inputted to the moving path storing device 52 is output signals from the respective displacement detectors 41, 42 and 43 in the main body 2 of the measuring instrument. The operation command device 53 operates such that positional data from a Z-axis position detector 54 for detecting a position in the direction of Z-axis of the vertically movable block 23 being vertically movable by the Z-axis driving motor 22, positional data from a Y-axis position detector 55 for detecting positions in the direction of Y-axis of the linearly movable rods 25 being movable by the Y-axis driving motor 24, and angular data from a $\theta$ angle detector 56 for detecting a swing angle of the swingable arm 28 being swingable by the swingably driving motor 26 are compared with the command value converted from the moving path data, so that the respective motors 22, 24 and 26 are given the driving command by the differences.

Description will hereunder be given of the measuring method in this embodiment. In the measurement according to this system, firstly, a detecting element moving step storing process is carried out, and thereafter, a measured data fetch process and a measured value calculating process are repeatedly carried out over all of the steps of the measuring step program.

In the detecting element moving step storing process, a smaple of work to be measured is rested on a mount with the main body 2 of measuring instrument and the robot mechanism 4 being connected to each other, and thereafter, the touch signal probe 17 of the main body 2 of the coordinate measuring instrument is manually moved along the sample of work to be measured in accordance with a measuring step program preset in the measuring step program memory 44 of the data processing unit 5. In this case, a portion to be manually grasped may be any one of those including the touch signal probe 17, the probe shaft 18 disposed close to the touch signal probe 17, the connecting arm 29 of the robot mechanism 4 and the like. Then, in the moving path storing device 52 of the robot operating command unit 3, there are successively stored the data from the displacement detectors 41, 42 and 43 obtained at respective times of movement of the touch signal probe 17. In short, the moving path of the touch signal probe 17, when the touch signal probe 17 moves in accordance with the measuring step program, is stored in the moving path storing device 52. If this process is carried out over all the steps of the measuring step program stored in the measuring step program memory 44, then, in the moving path storing device 52, there are successively stored the moving path of the robot mechanism 4 corresponding to the respective steps of the measuring step program.

As described above, the moving path of the touch signal probe 17 corresponding to the measuring step program is stored in the moving path storing device 52 of the robot operating command unit 3, and thereafter, a sample of the work is replaced with the work to be measured, so that a measured data fetch process and a measured value calculating process are carried out.

Figure 4:
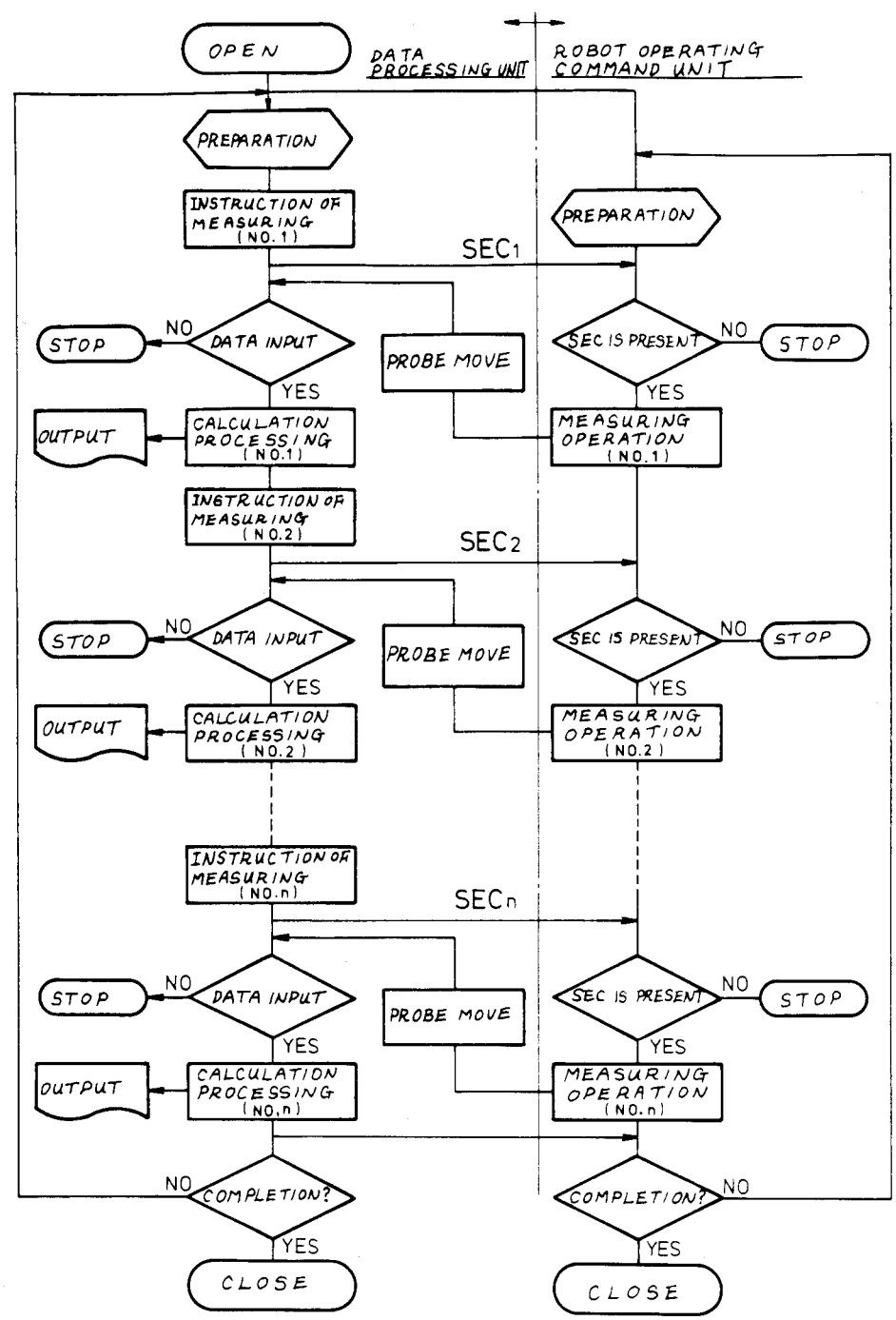

The measured data fetch process and the measured value calculating process are carried in accordance with the processing of the flow chart shown in FIG. 4. More specifically, when the data processing unit 5 is set at a measuring mode, the processing of preparation is carried out in both the data processing unit 5 and the robot operating command unit 3. Thereafter, in the data processing unit 5, a first step out of the measuring step program stored in the measuring step program memory 44, i.e. a first item of measurement, is instructed, and a step exciting command SEC, corresponding to this item of measurement is given to the operation command device 53 of the robot operating command unit 3.

When the step exciting command $SEC_1$ is given from the data processing unit 5, the operation command device 53 of the robot operating command unit 3 reads out the moving path data corresponding to the step exciting command $SEC_1$, from the moving path storing device 52, and converts the moving path data to the driving value of the respective motors 22, 24 and 26, so that the Z-axis driving motor 22, Y-axis driving motor 24 and swingably driving motor 26 are driven through the motor driving device 51 on the basis of the driving command value thus converted. Then, the touch signal probe 17 is moved through the robot mechanism 4. When the movement of the touch signal probe 17 brings the touch signal probe 17 into contact with the work 11, a touch signal is given from the touch signal probe 17 to the data processing unit 5. At this time, there are fetched into the data processing unit 5 positional data in the direction of X-axis detected by the X-axis displacement detector 41, positional data in the direction of Y-axis detected by the Y-axis displacement detector 42 and positional data in the direction of Z-axis detected by the Z-axis displacement detector 43, respectively. In this process, firstly, the probe is replaced with another one, the measurement may be carried out.

When a predetermined number of the measured data given by the X-, Y- and Z-axes displacement detectors 41, 42 and 43 are inputted, the data processing unit 5 calculates a dimension or the like of the work 11 on the basis of these measured data, and outputs the result of calculation by a printer or the like for example. Upon completion of this calculation, out of the measuring step program stored in the measuring step program memory 44, a second step, i.e. a second item of measurement is instructed, and a step exciting command $SEC_2$ based on the second item of measurement is given to the operation command device 53 of the robot operating command unit 3.

When the step exciting command $SEC_2$ is given from the data processing unit 5, the operation command device 53 of the robot operating command unit 3 reads out the moving path data corresponding to the step exciting command $SEC_2$ from the moving path storing device 52, and converts the moving path data to the driving value of the respective motors 22, 24 and 26, so that the Z-axis driving motor 22, Y-axis driving motor 24 and swingably driving motor 26 are driven through the motor driving device 51 on the basis of the driving command value thus converted.

As described above, the measured data fetch process and the measured value calculating process are automatically, repeatedly made over all the steps of the measuring step program, whereby automated measurement can be performed.

In consequence, according to this embodiment, the touch signal probe 17 is moved by the robot mechanism 4 provided independently of the main body of tri-dimensional measuring instrument 2, so that both the drawbacks of the measuring instruments of the manual type and the automatic types can be obviated simultaneously. In short, even in the case of a large-sized measuring instrument, the measurer can remotely control the measuring instrument at a predetermined position, so that the measurement can be secured. Moreover, the measurer need not directly grasp the probe or the like, so that the influence of the change in temperature can be minimized. Furthermore, there is no need to provide a screw, motor or the like for moving the touch signal probe 17 on the main body of tri-dimensional measuring instrument 2, whereby the construction of the measuring instrument is simplified, so that distortions and deflections by the weight can be avoided, thus enabling to make the measurement with high accuracy.

Furthermore, the robot mechanism 4 is operated in accordance with the moving path data stored in the moving path storing device 52 of the robot operating command unit 3, whereby there is no need for the measurer to remember the portions of measurement and steps with every work to be measured as in the measuring instrument of the manual type, thereby enabling to eliminate a possibility of making a mistaken operation. Moreover, if a specialist is caused to make a pattern operation of the robot mechanism 4, and, if the moving path thus obtained is stored in the moving path storing device 52, then the operation can be automatically performed, so that the burden of the specialist can be relieved, thus enabling to expect the rapid spread.

Storage of the moving path of the touch signal probe 17 in the moving path storing device 52 can be performed with the main body 2 of measuring instrument and the robot mechanism 4 being connected to each other, the moving path can be set very easily and quickly. Moreover, in this state, if the touch signal probe 17 of the main body 2 of measuring instrument is manually moved in accordance with the predetermined measuring steps preset, then the storage of the moving path of the touch signal probe 17 is automatically carried out through the utilization of output signals from the displacement detectors 41, 42 and 43, so that the moving path can be stored very efficiently. Anyhow, when the robot mechanism 4 is operated during the measurement, the positional control of the robot mechanism 4 is performed in response to feedback signals from the detectors 54, 55 and 56 of the robot mechanism 4, thus presenting such a disadvantage that there occurs an error in position between a detector for storing the moving path data and a detector during the measurement. However, when the touch signal probe 17 is used as the detecting element, there is an allowable over-stroke of about 10–5 mm. Even if an overrun occurs, measured data are fetched by a touch signal generated at the time of contact, thus presenting no problem either structurally or in the terms of accuracy.

Moreover, it is sufficient to position the robot mechanism 4 with the accuracy of an allowable over-stroke ($\approx$10–5 mm) of the touch signal probe 17, whereby there is no need of providing a high class robot mechanism and the like. In short, the touch signal probe 17 is of such an arrangement that an over-stroke within the above-described range is allowable and the touch signal probe 17 can automatically return to a predetermined posture under the free conditions. However, such an advantage inherent in the measuring instrument can be offered that even if the touch signal probe 17 overruns, no measuring error occurs without using a high class robot mechanism because measured data are fetched in response to a touch signal generated at the time of contact. This fact is further advantageous in that the matching therebetween may be not so much strict.

Furthermore, in order to excite the robot mechanism 4, it is only necessary for the data processing unit 5 to give the step exciting command SEC to the operation command device 53 of the robot operating command unit 3. In short, only the data processing unit 5 and the robot operating command unit 3 should be connected to each other by the step exciting command SEC, so that, even when the method is adopted in the conventional manual type tri-dimensional measuring instrument, the arrangement may be achieved easily and economically.

Additionally, in the above embodiment, the touch signal probe 17 has been manually moved while being connected to the robot mechanism 4 and this moving path has been stored in the moving path storing device 52, however, the present invention need not necessarily be limited to this, and this moving path may be stored in the storing device 52 with the touch signal probe 17 being detached from the robot mechanism 4. This detaching may be made by untightening the set-screw 30 (FIG. 2) to remove the forward end of the connecting arm 29 from the probe shaft 18. With this arrangement, the storage is completed, and thereafter, both members are connected to each other again, so that the subsequent measurement can be automatically performed.

When the touch signal probe 17 is manually moved while being detached from the robot mechanism 4 as described above, the manual moving of the touch signal probe 17 can be carried out by a slight control force. In addition thereto, the moving path data of the touch signal probe 17 can be outputted to the side of the robot mechanism 4 through the utilization of the highly accurate displacement detectors on the side of the main body 2 of measuring instrument, so that the moving path can be stored highly accurately.

Furthermore, the moving path of the touch signal probe 17 has been stored in the moving path storing device 52 through the utilization of the output signals from the displacement detectors 41, 42 and 43 of the measuring instrument, while, when the robot mechanism 4 is operated during the measurement, the positional control of the robot mechanism 4 has been carried out in response to the feedback signals from the detectors 54, 55 and 56 of the robot mechanism 4, however, the moving path of the touch signal probe 17 may be stored in the moving path storing device 52 through the utilization of the output signals from the detectors 54, 55 and 56 of the robot mechanism 4 for example. With this arrangement, no error in position occurs between the time of storing the moving path and the time of positional control. Further, even when the output signals from the displacement detectors 41, 42 and 43 of the main body 2 of measuring instrument are given to the operation command device 53 of the robot operating command unit 3 as the feedback signals, no error in position occurs between the time of storing the moving path and the time of positional control, and moreover, the position detectors 54, 55 and 56 of the robot mechanism 4 can be advantageously dispensed with.

Furthermore, the moving path data of the touch signal probe 17, stored in the moving path storing device 52, have been converted to the driving values of the motors 22, 24 and 26 of the robot mechanism 4 in the operation command device 53, however, the moving path data may be converted to the driving values of the motors 22, 24 and 26 and stored in the moving path storing device 52 when the moving path of the touch signal probe 17 is stored in the moving path storing device 52.

Furthermore, the moving mechanism 19 on the side of the main body 2 of measuring instrument need not necessarily be limited to the construction in the above embodiment, and any one, which can move the touch signal probe 17 by a comparatively small force in the tri-dimensional directions, may be adopted. Further, the detecting element need not necessarily be limited to the touch signal probe 17 described in the above embodiment, and, for example, a non-contact type optical detector may be adopted.

Figure 5:
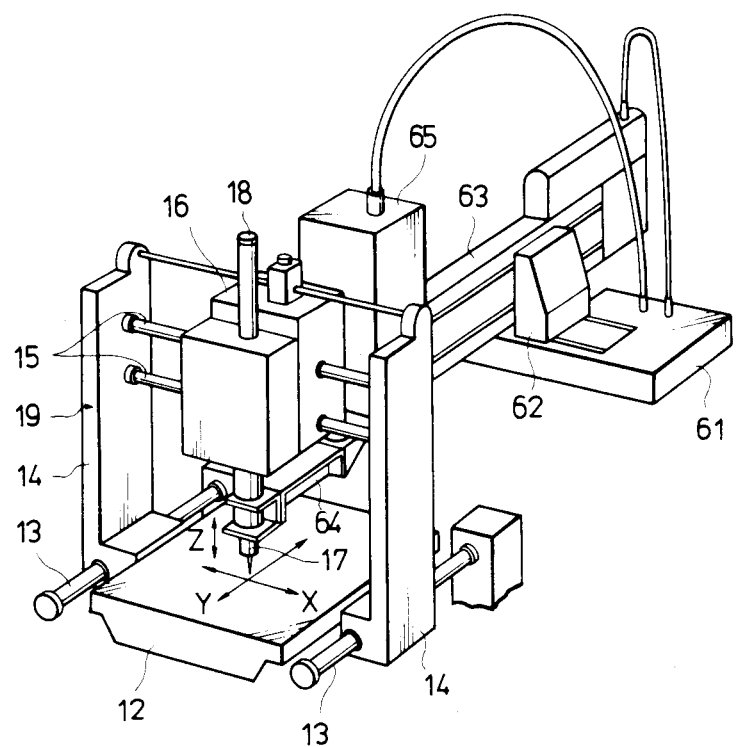

Similarly, the robot mechanism 4 may be any one, only if it can perform the tri-dimensional movements of the moving mechanism 19. For example, as shown in FIG. 5, a movable table 62 is provided on a bedplate 61 in a manner to be movable in the same direction as the X-axis direction of the touch signal probe 17, a support frame 63 is provided on this movable table 62 in a manner to be movable in the same direction as the Y-axis direction of the touch signal probe 17, and a vertically movable device 65 is provided for moving one end of a connecting lever 64 connected at the other end to the probe shaft 18 in the same direction as the Z-axis direction of the touch signal probe 17. With this arrangement, the three shafts of the robot mechanism 4 coincide with the X-, Y- and Z-axes of the main body 2 of measuring instrument, respectively, so that, it is advantageous in that, in storing the moving path data, there is no need of converting the signals of the displacement detectors 41, 42 and 43 into the driving values of the motors 22, 24 and 26. Further, the driving sources of the robot mechanism 4 need not necessarily be limited to the motors described in the above embodiment, and may be other driving sources such for example as ones using hydraulic pressure, pneumatic pressure or the like.

Furthermore, in the above embodiment, a hand at the forward end of the robot mechanism 4 has been engaged with the probe shaft at a position close to the touch signal probe 17, however, this engagement may be made at an optional position of the touch signal probe 17 or of the probe shaft 18. For example, if one end of the connecting arm at the forward end of the robot mechanism 4 is engaged with the top end of the probe shaft 18, an effective scope of measuring may avoid being reduced because the arms of the robot mechanism 4 may not impinge against the work 11 to be measured. Moreover, in doing so, the robot mechanism can be disposed on one side of the main body 2 of the measuring instrument, so that a space in the longitudinal direction on the mount can be secured.

Furthermore, the robot mechanism 4 has been formed quite separately of the main body 2 of the measuring instrument, however, for example, the robot mechanism 4 may be secured to the mount 12 or the mount 12 may additionally function as the robot mechanism 4 only if no burden of weight is imposed on the movable portion of the touch signal probe 17. With this arrangement, the system as a whole can be advantageously rendered compact in size.

As has been described hereinabove, the present invention can provide a measuring method by a coordinate measuring instrument, wherein advantages of both the manual and automatic type can be utilized, the disadvantages of both types can be obviated, and, in making the measuring instrument into the automatic type, the moving path for moving the detecting element in accordance with the measuring steps can be efficiently set.

What is claimed is:

1. In a method of measuring by a coordinate measuring instrument including a robot mechanism with driving means coupled to a detecting element for moving said detecting element in tri-dimensional directions to bring said detecting element into contact with a work to be measured rested on a mount, displacement detectors for detecting displacement values of said detecting element, and a data processing unit for processing an output signal from said displacement detectors in a predetermined manner to provide dimensions of said work, the method comprising the steps of:

uncoupling said detecting element from said driving means of said robot mechanism;

manually moving, during a detecting element moving step storing process, said detecting element along a sample of work to be measured rested on said mount in accordance with a predetermined measuring step program, including a plurality of steps preset in said data processing unit; while, a moving path of said detecting element is detected by said displacement detectors, output signals from said displacement detectors are outputted to a robot operating command unit of said robot mechanism, said robot mechanism being independent of a main body of said coordinate measuring instrument, to thereby store the moving path of said detecting element in said robot operating command unit;

coupling said detector element to said driving means of said robot mechanism;

replacing said sample of work with a work to be measured;

operating said robot mechanism so that said driving means thereof will bring, during a measured data fetch process said detecting element into contact with said work to be measured in accordance with moving path data recorded in said robot operating command unit in response to each of the steps of said measuring step program, and simultaneously feeding output signals of said displacement detectors into said data processing unit;

calculating, during a measured value calculating process, dimensions of said work on the basis of the measured data collected during said measured data fetch process and feeding a succeeding step exciting command to said robot operating command unit upon completion of the calculation; and wherein said measured data fetch process and said measured data calculating process are repeated over all steps of said measuring step program so as to effect an automatic measuring task on different works to be measured.

2. The method as set forth in claim 1, wherein further displacement detectors are provided in said robot mechansim to facilitate positional data from said further displacement detectors being compared with said moving path data so that said drive means are given the driving command by the differences.

3. The method as set forth in claim 1, wherein said step of uncoupling said detecting element from said driving means of said robot mechanism includes the step of physically detaching said detecting element from said robot mechanism so that said output signals from said displacement detectors are supplied to said data processing unit.

4. The method as set forth in claim 3, wherein the movement of said detecting element during said detecting element moving step storing process is performed with said detecting element being physically detached from said robot mechanism.

* * * * *